(12) United States Patent
Wood et al.

(10) Patent No.: US 11,385,644 B2
(45) Date of Patent: *Jul. 12, 2022

(54) CONFIGURING MOTION PLANNING FOR A SELF-DRIVING TRACTOR UNIT

(71) Applicant: UATC, LLC, Mountain View, CA (US)

(72) Inventors: Matthew Shaw Wood, Pittsburgh, PA (US); Nancy Yung-Hui Sun, Pittsburgh, PA (US); Zachias Rauch Vawter, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/360,370

(22) Filed: Jun. 28, 2021

(65) Prior Publication Data

US 2021/0325881 A1     Oct. 21, 2021

Related U.S. Application Data

(63) Continuation of application No. 15/678,984, filed on Aug. 16, 2017, now Pat. No. 11,048,251.

(51) Int. Cl.
| | |
|---|---|
| *G05D 1/00* | (2006.01) |
| *B60W 30/00* | (2006.01) |
| *B62D 13/00* | (2006.01) |
| *G05D 1/02* | (2020.01) |
| *G06V 20/56* | (2022.01) |

(52) U.S. Cl.
CPC ........... *G05D 1/0088* (2013.01); *B60W 30/00* (2013.01); *B62D 13/00* (2013.01); *G05D 1/0246* (2013.01); *G05D 1/0257* (2013.01); *G05D 1/0276* (2013.01); *G05D 2201/0213* (2013.01); *G06T 2207/30252* (2013.01); *G06V 20/588* (2022.01)

(58) Field of Classification Search
CPC .. G05D 1/0088; G05D 1/0276; G05D 1/0246; G05D 1/0257; G05D 2201/0213; B60W 30/00; B60W 30/10; B60W 30/16; B60W 2420/42; B60W 2530/00; B60W 50/0098; B60W 2050/0083; G06T 2207/30252; G06K 9/00798; B62D 13/00
See application file for complete search history.

(56) References Cited

U.S. PATENT DOCUMENTS

| | | |
|---|---|---|
| 9,457,970 B1 | 10/2016 | Zevenbergen |
| 2007/0017715 A1 | 1/2007 | Mccann |
| 2010/0019881 A1 | 1/2010 | Shimura |
| 2010/0198491 A1 | 8/2010 | Mays |
| 2012/0258731 A1 | 10/2012 | Smith |
| 2014/0176716 A1 | 6/2014 | Wallat |
| 2014/0333729 A1 | 11/2014 | Pflug |
| 2015/0203156 A1 | 7/2015 | Hafner |
| 2016/0027303 A1 | 1/2016 | Zhao |
| 2016/0054735 A1 | 2/2016 | Switkes |

(Continued)

*Primary Examiner* — Mussa A Shaawat
(74) *Attorney, Agent, or Firm* — Dority & Manning, P.A.

(57) ABSTRACT

A control system of a self-driving tractor can access sensor data to determine a set of trailer configuration parameters of a cargo trailer coupled to the self-driving tractor. Based on the set of trailer configuration parameters, the control system can configure a motion planning model for autonomously controlling the acceleration, braking, and steering systems of the tractor.

20 Claims, 6 Drawing Sheets

(56) References Cited

U.S. PATENT DOCUMENTS

| | | |
|---|---|---|
| 2017/0124881 A1 | 5/2017 | Whitehead |
| 2018/0057052 A1* | 3/2018 | Dodd |
| 2018/0247160 A1* | 8/2018 | Rohani ............... G05D 1/0088 |
| 2018/0313282 A1 | 11/2018 | Pati |
| 2018/0346029 A1 | 12/2018 | Kabos |
| 2018/0372875 A1 | 12/2018 | Juelsgaard |
| 2019/0016382 A1 | 1/2019 | Zarco |
| 2019/0039425 A1 | 2/2019 | Dodd |

\* cited by examiner

CONFIGURING MOTION PLANNING FOR A SELF-DRIVING TRACTOR UNIT

PRIORITY CLAIM

The present application is a continuation and entitled to the benefit of U.S. application Ser. No. 15/678,984, filed Aug. 16, 2017. The present application claims priority to, benefit of, and incorporates by reference the contents of the cited application.

BACKGROUND

Operation of semi-trailer trucks requires intensive training to negotiate turns, perform reversing maneuvers, navigate narrow city roads, handle traffic congestion, and performing parking and docking maneuvers with adequate clearance to safely avoid obstacles. Operators of semi-trailer trucks are typically required to attend a training school or program certified by the Professional Truck Driver Institute (PTDI), and must pass written knowledge exams and skills tests to receive a commercial driver's license. A primary reason for such extensive training is the complexity of safely setting up and controlling a cargo trailer typically coupled to the fifth wheel of the tractor unit.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

A self-driving tractor unit for a semi-trailer truck is described herein. The self-driving tractor unit can include sensors mounted in one or more sensors arrays on the exterior of the self-driving tractor unit, such as monocular or stereo cameras, LIDAR sensors, proximity sensors, infrared sensors, sonar sensors, and the like. The self-driving tractor unit can also include a control system comprising processing resources, such as field programmable gate arrays and CPUs, that couple to operate the various control mechanisms of the self-driving tractor unit. These control mechanisms can include the tractor unit's acceleration, braking, and steering systems, as well as the various signaling, shifting, and lighting systems.

A number of the sensors may be rearward facing, or have fields of view that include the cargo trailer or a portion of the cargo trailer. For example, a top rearward-facing camera can generate image data identifying the full length of the top of the cargo trailer, while a lower rearward facing camera extending from the front bumper of the tractor unit can detect an axle or bogie position of the cargo trailer. Additionally or alternatively, one or more of LIDAR sensors mounted to respective booms of a rooftop sensor array of the tractor unit can generate detailed LIDAR sensor data that indicates the dimensions of the cargo trailer as well as the location of the bogie and axle positions. Based at least partially on sensor data from the sensors, the control system can determine a set of trailer configuration parameters of a cargo trailer coupled to the self-driving tractor unit. Based on the trailer configuration parameters, the control system can modify a motion planning model for autonomously controlling the acceleration, braking, and steering systems of the tractor unit.

The trailer configuration parameters can comprise a set of parameters that can affect the trajectory of the cargo trailer as it is pulled or pushed by the tractor unit (e.g., around sharp turn or during docking procedures). In certain examples, the trailer configuration parameters can comprise the kingpin overhang length of the cargo trailer (e.g., the bogie slider position), initial trailer angle, trailer shape characteristics, and a length, width, and/or height of the cargo trailer to determine its clearance values. Additionally or alternatively, the configuration parameters can include the type of trailer (e.g., refrigerated, auto-carrier, flat-bed, hazardous material, etc.), the number of wheels and axles of the rear bogie, the number of trailers and bogies (e.g., for double or triple trailers), the tire compounds and/or tread pattern, certain aerodynamic features of the cargo trailer (e.g., lower trailer fairings or skirts, gap devices, nose cones, wheel covers, bogie fairings, rear boat tails, etc.), the trailer weight, cargo arrangement within or on top of the trailer, the center of gravity of the trailer, and the like. Such trailer configuration parameters can be directly observable by the sensor systems of the tractor unit, or may be inferred, or trailer-specific information may be determined via a database lookup or received from a remote trailer tracking or management resource.

Once the configuration parameters of the cargo trailer are determined, the control system of the tractor unit can modify or configure a motion planning model that controls the manner in which the control system autonomously operates the control mechanisms of the tractor unit (e.g., the acceleration, braking, and steering systems). As an example, the trailer length and rear bogie position can affect how wide the tractor unit must take turns in order to provide adequate clearance to curbs, proximate vehicles, pedestrians, and other traffic lanes. Furthermore, the presence of rear boat tails and other aerodynamic features on the cargo trailer can affect docking procedures. Still further, the cargo weight distribution, thrust line offset or axle misalignment, the current road conditions and weather conditions, and the type of cargo trailer can also affect the manner in which the control system modifies its motion planning model. For example, the control system can increase clearance requirements for a trailer carrying hazardous materials, such as gasoline, propane, or liquid nitrogen. Accordingly, the control system can computationally optimize its motion planning model based on the various detected or determine trailer configuration parameters.

In some aspects, the control system can autonomously drive the tractor unit around the cargo trailer prior to hookup to collect sensor data corresponding to the trailer configuration parameters. Additionally, the collected sensor data can provide identifying information of the cargo trailer, such as the trailer's vehicle identification number (VIN) or license plate number. In variations, when the tractor unit is hooked up to the cargo trailer, the control system can receive, over a data bus, the identifying information from the cargo trailer (e.g., by connecting with a memory device of the cargo trailer). In further variations, the control system of the tractor unit can receive the identifying information of the cargo trailer from remote resource, such as a backend cargo trailer tracking, coordination, and management system (e.g., operating on remote servers of a datacenter).

Using the identifying information of the cargo trailer, the control system can perform a lookup for additional configuration parameters of the cargo trailer. The lookup may be performed in a local database of the tractor unit or a remote resource. In certain implementations, by performing the lookup, the control system can determine general information concerning the physical dimensions and setup of the trailer, or for more dynamic trailer tracking and coordination implementations, the additional configuration parameters can include the cargo, cargo weight, and cargo distribution within the trailer.

Among other benefits, the examples described herein achieve a technical effect of providing autonomous self-driving tractor units with specific cargo trailer information to enable the tractor unit to operate more effectively and efficiently when pulling cargo trailers. When the self-driving tractor unit has the trailer configuration parameters specific to an individual cargo trailer, a more precise motion planning model can be generated and executed by the control system of the tractor unit to ensure adequate clearance to objects and entities during operation, proper docking execution, and maintaining the cargo trailer in a safe state.

As used herein, a computing device refers to devices corresponding to desktop computers, cellular devices or smartphones, personal digital assistants (PDAs), laptop computers, tablet devices, virtual reality (VR) and/or augmented reality (AR) devices, wearable computing devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic. An action performed automatically, as used herein, means the action is performed without necessarily requiring human intervention.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In one embodiment, a software module is implemented with a computer program product including a computer-readable non-transitory medium containing computer program code, which can be executed by a computer processor for performing any or all of the steps, operations, or processes described. As such, one or more general purpose processors coupled to the computer-readable medium correspond to a special purpose processor system for performing the steps, operations, or processes described herein. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as those carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Numerous examples are referenced herein in context of a self-driving vehicle. A self-driving vehicle refers to a vehicle that is operated in a state of automation with respect to steering and propulsion. Different levels of autonomy may exist with respect to self-driving vehicles. For example, some vehicles may enable automation in limited scenarios, such as on highways, provided that drivers are present in the vehicle. More advanced self-driving vehicles can drive without any human assistance from within or external to the vehicle.

Example Self-Driving Semi-Trailer Trucks

Figure 1:
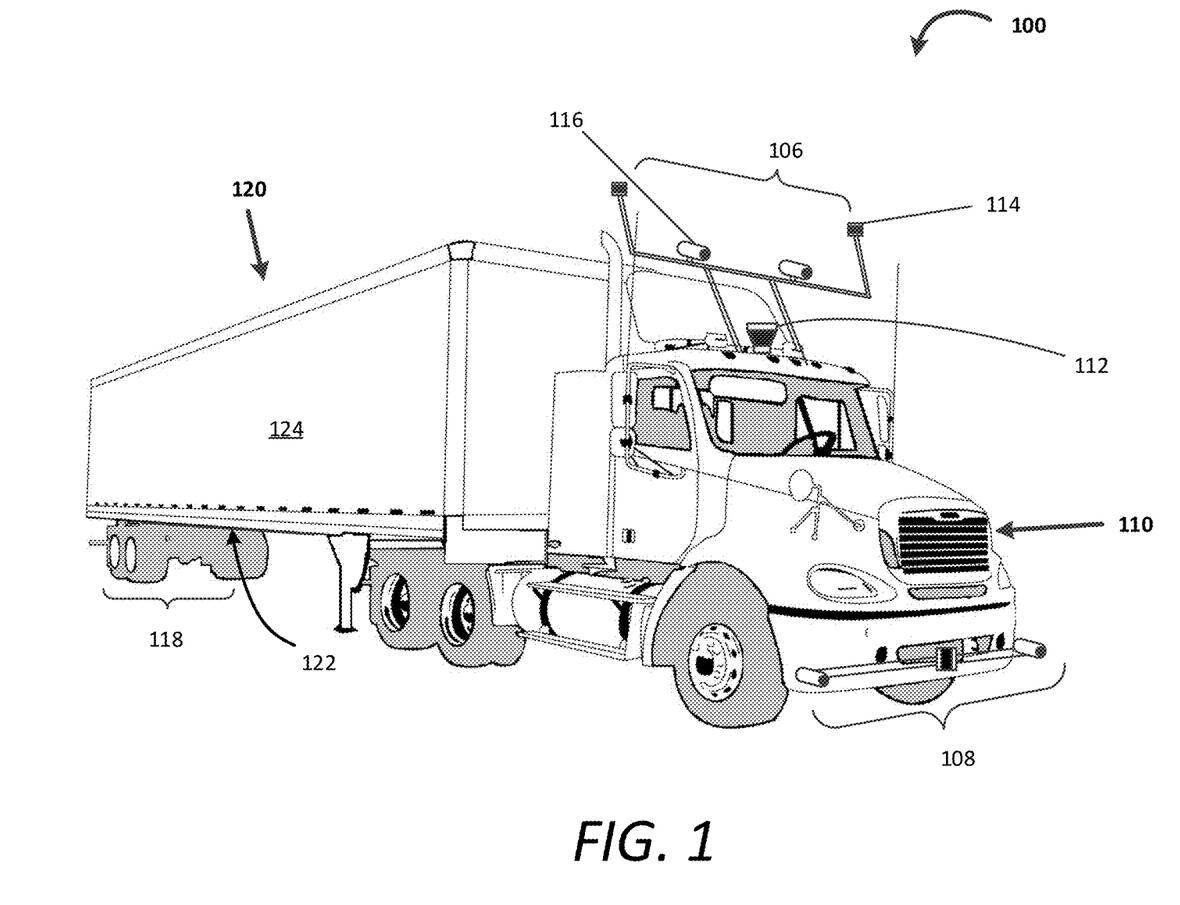
FIG. 1 illustrates a self-driving semi-trailer truck including a self-driving tractor unit coupled to a cargo trailer, according to examples described herein.

FIG. 1 illustrates a self-driving semi-trailer truck including a self-driving tractor unit coupled to a cargo trailer, according to examples described herein. As shown in FIG. 1, the self-driving semi-trailer truck 100 can include a self-driving tractor unit 110 with a cargo trailer 120 having a kingpin coupled to a fifth wheel or trailer hitch of the self-driving tractor 110. The self-driving tractor 110 includes a number of sensor arrays 106, 108 each including any number of sensors and sensor types. For example, sensor array 106 can include a primary LIDAR sensor 112 and a number of additional LIDAR sensors 114, a number of cameras 116, and other sensors, such as a radar system, proximity sensors, infrared sensors, sonar sensors, and the like. The various sensors of the sensor arrays 106, 108 can provide an autonomous control system of the self-driving tractor 110 with a fused sensor view of a surrounding environment of the self-driving semi-trailer truck 100 to enable the control system to autonomous operate the control mechanisms of the self-driving tractor 110, as described in detail below.

The cargo trailer 120 can be any type of trailer that couples to the fifth wheel or trailer hitch of the tractor 100, and can carry any type of cargo. For example, the cargo trailer 120 can comprise a standard box trailer, a car-carrier trailer, a flatbed trailer, a tanker trailer, a dump trailer, a hopper bottom trailer, a lowboy trailer, a refrigeration trailer, a tank container chassis trailer, or a double trailer. In general, the cargo trailer 120 can comprise a cargo carrier 124, a rear bogie 118, and a bogie slider 122 configured to change the position of the rear bogie 118 in relation to the cargo carrier 124. In certain implementations, the bogie slider 122 is manually configured to position the rear bogie 118 beneath the cargo carrier 124. For example, while the cargo carrier 124 is coupled to the fifth wheel of the tractor 110, and with the bogie slider 122 disengaged, the self-driving tractor 110 can autonomously drive forward or rearward to reposition the rear bogie 118 in relation to the cargo carrier 124. Thereafter, the bogie slider 122 can be engaged to affix the rear bogie 118 to the cargo carrier 124 at the desired position.

In variations, the rear bogie 118 can be automatically repositioned beneath cargo carrier 124. For example, at least one of the rear bogie 118, the cargo carrier 124, or the bogie slider 122 can include a linear motor, such as a linear electric motor, operable by a position controller that can operate the linear motor to reposition the rear bogie 118 beneath the cargo carrier 124. In such variations, the position controller of the rear bogie 118 and/or cargo carrier 124 can be coupled to the control system of the self-driving tractor 110 (e.g., upon kingpin hookup of the cargo trailer 120 to the fifth wheel), and the control system of the tractor 110 can manipulate the position of the rear bogie 118 beneath the cargo carrier 124 (e.g., based on a weight distribution of cargo within the cargo carrier 124 or a determined center of gravity of the cargo trailer 120).

According to examples described herein, the control system of the tractor 110 can actively position the rear bogie 118 beneath the cargo carrier 124 based on information determined through monitoring sensor data identifying the initial configuration of the cargo trailer 120, and/or receiving or looking up trailer-specific information of the cargo-trailer 120 (e.g., a total weight, cargo weight, cargo distribution, or weight distribution). For example, based on such information, the control system of the self-driving tractor 110 can determine an optimal position for the rear bogie 118 beneath the cargo carrier 124, and through active autonomous operation of the position controller(s) of the rear bogie 118 and/or cargo carrier 124, the control system can configure the optimal position of the rear bogie 118. Once the rear bogie 118 is in the desired or optimized position beneath the cargo carrier 124, the control system of the tractor 110 can engaged or lock the bogie slider 122 in place. With the rear bogie 118 optimally configured, the control system of the tractor 110 may then modify a motion planning model for operating the acceleration, braking, and steering systems of the self-driving tractor 110 for autonomously operating the self-driving semi-trailer truck 100.

In certain implementations, the rear bogie 118 may be pre-positioned underneath the cargo trailer 120 when the cargo trailer 120 is coupled to the self-driving tractor 110. In such examples, the control system of the tractor 110 can analyze sensor data from the various sensors of the tractor 110 to identify the position of the rear bogie 118 or its individual axles. Rear bogies typically employ a dual axle configuration, with a standardized spacing between the axles. Accordingly, utilizing the sensor data, the control system of the tractor 110 can identify a position of a near axle, or first axle of the rear bogie 118, and then infer the position of the far axle, or second axle of the rear bogie 118. Additionally or alternatively, the control system can also analyze the sensor data to determine the length, width, and height of the cargo carrier 124 as well as other configurations, such as any aerodynamic features. These aerodynamic features can include lower trailer fairings or skirts, gap devices, nose cones, wheel covers, bogie fairings, rear boat tails, and the like. Examples described herein recognize that certain aerodynamic features can affect certain operative characteristics of the semi-trailer truck 100, such as handling characteristics, fuel mileage, docking clearance, and kingpin overhang. Any one or more of these operative characteristics can be factored into the motion planning model generated and employed by the control system in autonomously operating the self-driving tractor 110.

In certain examples, the control system of the tractor 110 can determine additional configuration parameters of the cargo trailer 120. For example, the control system can analyze the sensor data to determine the type of cargo carrier 124 and/or the number of cargo carriers 124 and bogies. Example types of cargo carriers 124 can include a standard box trailer (as shown in FIG. 1), a car-carrier trailer, a flatbed trailer, a tanker trailer, a dump trailer, a hopper bottom trailer, a lowboy trailer, a refrigeration trailer, a tank container chassis trailer, or a double or triple trailer. In certain scenarios, the control system of the tractor 110 can further infer a weight of the cargo trailer 120, either based on direct analysis of the sensor data (e.g., observing a full load of vehicles on a car-carrier trailer), or based on the torque or force necessary to pull the cargo trailer 120. For example, a strain gauge or mechanical force sensor may be included in the fifth wheel to measure the dynamic pull force of the cargo trailer 120, and the control system can extrapolate the weight of the cargo trailer 120 based on the measured forces.

In certain examples, the control system of the tractor 110 can receive or otherwise determine additional information concerning the configuration parameters of the cargo trailer 120. In some aspects, the control system of the tractor 110 can receive trailer configuration information directly from a memory resource of the cargo trailer 120 when the cargo trailer 120 is hooked up via a wired connection to the tractor 110 (e.g., via a data pin or power pin of a round pin connector). In variations, certain configuration parameters of the cargo trailer 120 may be imprinted on scannable resources, such as RFID chips or a QR code, and can be manually scanned and uploaded or otherwise provided to the control system of the self-driving tractor 110 to modify its motion planning model. In other examples, the control system of the tractor 110 can include network connectivity resources, such as a Bluetooth, Wi-Fi, cellular, or other wireless radio-frequency communication module that communicates with a backend trailer coordination system operating on a remote datacenter, which can provide certain trailer configuration parameters and other information related to the cargo trailer 120, such as the cargo being carried and the cargo mass. Other trailer configuration parameters that can be communicated to the control system of the tractor 110 can include the wheel size, tire compounds and/or tire treads, which can affect the handling of the cargo trailer 120 in inclement weather.

Based on any one or more of the trailer configuration parameters described herein, the control system of the tractor 110 can modify its motion planning model accordingly. In addition to modifying the motion planning model, the control system of the tractor 110 can also monitor the cargo trailer 120 as the self-driving semi-trailer truck 100 operates throughout its given region. Live monitoring of the cargo trailer 120 can enable the control system to determine, for example, actual clearances, thrust line offset or axle misalignment of the rear bogie, any tire blowouts, etc. Thus, the motion planning model employed by the control system can also be modified dynamically based on the live monitoring of the cargo trailer 120. As described below, the motion planning model executed by the control system determines the manner in which the control system operates the acceleration, braking, steering, and other control mechanisms of the tractor 110.

Example Systems

Figure 2:
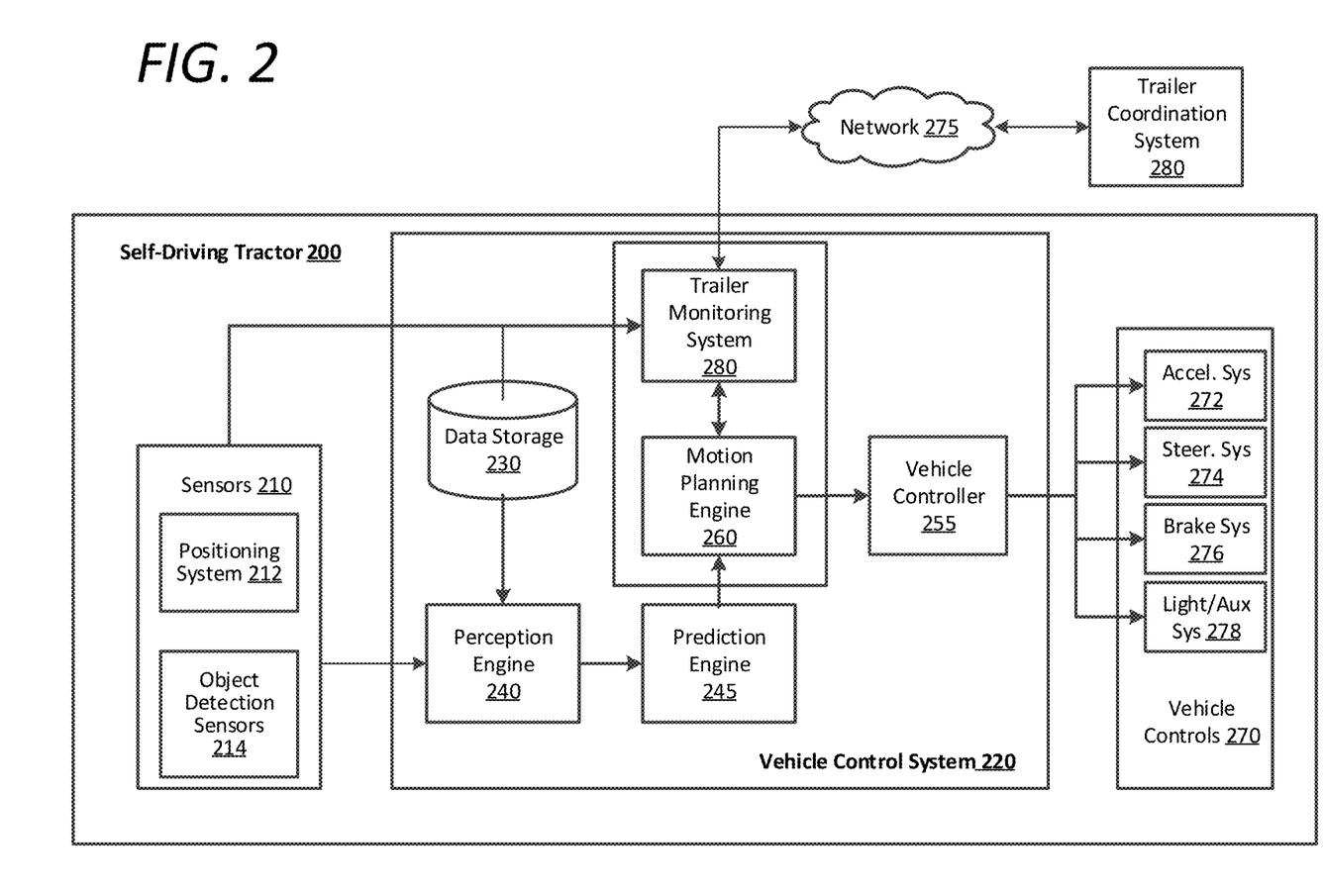
FIG. 2 is a block diagram illustrating an example self-driving tractor unit implementing an autonomous vehicle control system, as described herein.

FIG. 2 is a block diagram illustrating an example self-driving tractor implementing an autonomous vehicle control system, according to examples described herein. In an example of FIG. 2, a vehicle control system 220 can autonomously operate the self-driving tractor 200 throughout geographic regions for a variety of purposes, including transport services (e.g., on-demand transport, freight and delivery services, etc.). In examples described, the self-driving tractor 200 can operate autonomously without human control. For example, the self-driving tractor 200 can autonomously steer, accelerate, shift, brake, and operate lighting components. Some variations also recognize that the self-driving tractor 200 can switch between an autonomous mode, in which the vehicle control system 220 autonomously operates the tractor 200, and a manual mode in which a qualified driver takes over manual control of the acceleration system 272, steering system 274, braking system 276, and lighting and auxiliary systems 278 (e.g., directional signals and headlights).

According to some examples, the vehicle control system 220 can utilize specific sensor resources 210 to autonomously operate the tractor 200 in a variety of driving environments and conditions. For example, the vehicle control system 220 can operate the tractor 200 by autonomously operating the steering, acceleration, and braking systems 272, 274, 276 of the tractor 200 to a specified destination. The control system 220 can perform low-level vehicle control actions (e.g., braking, steering, accelerating) and high-level route planning using sensor information, as well as other inputs (e.g., transmissions from remote or local human operators, network communication from other vehicles, a freight transport coordination system, etc.).

In an example of FIG. 2, the vehicle control system 220 includes computational resources (e.g., processing cores and/or field programmable gate arrays (FPGAs)) which operate to process sensor data received from a sensors 210 of the tractor 200 that provides a sensor view of a road segment upon which the tractor 200 operates. The sensor data can be processed to determine actions which are to be performed by the tractor 200 in order for the tractor 200 to continue on a route to the destination, or in accordance with a set of transport instructions received from a remote freight transport coordination service. In some variations, the vehicle control system 220 can include other functionality, such as wireless communication capabilities using a communications module, to send and/or receive wireless communications over one or more networks 275 with one or more remote sources. In controlling the tractor 200, the control system 220 can generate commands to control the various vehicle control mechanisms 270 of the tractor 200, including the acceleration system 272, steering system 274, braking system 276, and auxiliary systems 278 (e.g., lights and directional signals).

The self-driving tractor 200 can be equipped with multiple types of sensors 210 which can combine to provide a computerized perception, or sensor view, of the space and the physical environment surrounding the tractor 200. Likewise, the control system 220 can operate within the tractor 200 to receive sensor data from the sensors 210 and to control the various vehicle controls 270 in order to autonomously operate the tractor 200. For example, the control system 220 can analyze the sensor data to generate low level commands executable by the acceleration system 272, steering system 274, and braking system 276 of the tractor 200. Execution of the commands by the control mechanisms 270 can result in throttle inputs, braking inputs, and steering inputs that collectively cause the tractor 200 to operate along sequential road segments according to a route plan.

In more detail, the sensors 210 operate to collectively obtain a live sensor view for the vehicle control system 220 (e.g., in a forward operational direction, or providing a 360 degree sensor view), and to further obtain situational information proximate to the tractor 200, including any potential hazards or obstacles. By way of example, the sensors 210 can include a positioning system 212, such as a GPS module, and object detection sensors 214. The object detection sensors 214 can be arranged in a sensor suite or sensor arrays mounted to the exterior of the tractor 200, such as on the front bumper and roof. The object detection sensors 214 can comprise multiple sets of cameras (video cameras, stereoscopic cameras or depth perception cameras, long range monocular cameras), LIDAR sensors, one or more radar sensors, and various other sensor resources such as sonar, proximity sensors, infrared sensors, and the like.

In general, the sensors 210 collectively provide sensor data to a perception engine 240 of the vehicle control system 220. The perception engine 240 can access a data storage 230 comprising localization sub-maps of the given region in which the tractor 200 operates. The localization sub-maps can comprise a series of road segment sub-maps that enable the perception engine 240 to perform dynamic comparisons with the live sensor view to perform object detection operations. As provided herein, the localization sub-maps can comprise highly detailed ground truth data of each road segment on which the self-driving tractor 200 can travel. For example, the localization sub-maps can encompass long stretches of highways where perception operations are relatively undemanding compared to a crowded urban environment. The localization sub-maps can comprise prerecorded and fused data (e.g., sensor data including image data, LIDAR data, and the like) by specialized mapping vehicles or autonomous vehicles with recording sensors and equipment, and can be processed to pinpoint various objects of interest (e.g., traffic signals, road signs, and other static objects). As the control system 220 autonomously operates the tractor 200 along a given route, the perception engine 240 can access sequential localization sub-maps of current road segments to compare the details of a current localization sub-map with the sensor data in order to detect and classify any objects of interest, such as road debris, other vehicles, pedestrians, bicyclists, and the like.

In various examples, the perception engine 240 can dynamically compare the live sensor data from the tractor's sensors 210 to the current localization sub-map as the tractor 200 travels through a corresponding road or highway segment. The perception engine 240 can identify and classify any objects of interest in the live sensor data that can indicate a potential hazard. In accordance with many examples, the perception engine 240 can provide object of interest data to a prediction engine 245 of the control system 220, where the objects of interest can each be classified (e.g., a pedestrian, a bicyclist, unknown objects, other vehicles, a static object, etc.).

Based on the classification of the detected objects, the prediction engine 245 can predict a path of each object of interest and determine whether the vehicle control system 220 should respond or react accordingly. For example, the prediction engine 245 can dynamically calculate a collision probability for each object of interest, and generate event alerts if the collision probability exceeds a certain threshold. As described herein, such event alerts can be processed by a motion planning engine 260 along with a processed sensor view indicating the classified objects within the live sensor view of the tractor 200. The vehicle controller 255 can then generate control commands executable by the various vehicle controls 270 of the tractor 200, such as the acceleration, steering, and braking systems 272, 274, 276. In certain examples, the motion planning engine 260 can determine an immediate, low level trajectory and/or higher-level plan for the tractor 200 based on the event alerts and processed sensor view (e.g., for the next 100 meters, up to a next intersection, or for a certain distance along a highway).

On a higher level, the motion planning engine 260 can provide the vehicle controller 255 with a route plan to a given destination, such as a pick-up location, a docking and drop off location, or other destination within a given road network. In various aspects, the motion planning engine 260 can generate the route plan based on transport instructions received from a remote freight coordination service (e.g., over the network 275). On a lower level, the motion planning engine 260 can provide the vehicle controller 255 with an immediate trajectory for the tractor 200 based on the objects of interest, obstacles, and collision probabilities identified and determined by the perception and prediction engines 240, 245. The vehicle controller 255 can generate the appropriate control commands executable by the vehicle controls 270 accordingly.

In various examples, the motion planning engine 260 generates trajectories for the tractor 200 in accordance with a motion planning model. Execution of the motion planning model enables the motion planning engine 260 to safely calculate and/or construct trajectories in accordance with the configuration and capabilities of the tractor 200, such as the maximum turning radius of the tractor 200, the dimensions of the tractor 200 (e.g., its overall length, width, and height), and the axle positions of the tractor 200 (e.g., to determine how wide to take a particular turn to ensure adequate clearance from curbs and objects).

According to various examples, whenever the tractor 200 is hooked up via a wired connection to a cargo trailer, the motion planning engine 260 must modify its motion planning model to account for the trajectory of the cargo trailer as well as the trajectory of the tractor 200. Thus, when the kingpin of a cargo trailer is coupled to the fifth wheel of the tractor 200, the motion planning engine 260 requires various configuration parameters of the cargo trailer in order to accurately modify its motion planning model. In some aspects, the trailer configuration parameters necessary for the motion planning model can comprise the dimensions of the cargo trailer, such as its height, width, length, and shape. Other trailer configuration parameters that can be factored into the motion planning model by the motion planning engine 260 can include the kingpin overhang length of the cargo trailer, the bogie slider of the rear bogie, the axle positions, and initial trailer angle. Additionally or alternatively, the configuration parameters can include the type of trailer (e.g., refrigerated, auto-carrier, flat-bed, hazardous material, etc.), the number of wheels and axles of the rear bogie, the number of trailers and bogies (e.g., for double or triple trailers), the tire compounds and/or tread pattern, aerodynamic features of the cargo trailer, the trailer weight, the cargo arrangement within or on top of the trailer, the center of gravity of the trailer, and the like. As described herein, the trailer configuration parameters can be directly observable via the sensors 210 of the tractor 200, or may be determined or inferred based on the sensor data. In variations, certain trailer configuration parameters can be determined via a database lookup or received from a remote trailer coordination system 280 (e.g., over network 275).

To determine the trailer configuration parameters, the vehicle control system 220 can include a trailer monitoring system 280, which can receive sensor data from one or more sensors 210 of tractor 200. For example, the tractor 200 can include a number of rearward facing cameras (e.g., attached on a boom of a rooftop sensor array, extending outward from bumper sensor array, or mounted to the rear wall of the cab of the tractor 200). Additionally or alternatively, the tractor 200 can include a number of LIDAR sensors having a rearward field of view that can detect a top and/or side surface of the cargo trailer. In further implementations, the tractor 200 can include a camera (monocular or stereo-camera) and/or a LIDAR sensor that can detect the rear bogie position of the cargo trailer, which can be coupled to the rear center axle of the tractor 200 (e.g., near the license plate holder), or a lower side position of the cab. In still further implementations, the sensors 210 of the tractor 200 can include a number force sensors (e.g., a spring sensor) within the fifth wheel which can detect forces from the cargo trailer when it is being pulled by the tractor 200. As described herein, the trailer monitoring system 280 can determine a weight of the cargo trailer based on such detected forces.

As further described herein, additional trailer configuration parameters can be determined by the trailer monitoring system 280, such as the trailer type. The trailer type can affect where the tractor 200 is permitted to travel. For example, the trailer monitoring system 280 can identify that the trailer type comprises a hazardous materials carrier, which may not be permitted on certain roads and areas. Thus, upon detecting the carrier type, the trailer monitoring system 280 can cause the motion planning engine 260 to block off certain routes through impermissible areas.

In certain implementations, the trailer monitoring system 280 can receive certain information concerning the cargo trailer over a communication network 275, or by performing a lookup in a local data storage device 230. For example, the trailer monitoring system 280 can receive identifying information corresponding to the cargo trailer, such as the cargo trailer's vehicle identification number or license plate number. In one example, the trailer monitoring system 280 receives the identifying information from a trailer coordination system 280 over the network 275. Additionally or alternatively, the trailer monitoring system 280 can receive additional information from the trailer coordination system 280, such as the cargo being carried, the cargo weight, and various configuration parameters of the cargo carrier or cargo trailer described herein. In variations, the trailer monitoring system 280 can detect the identifying information of the cargo trailer through the sensor data (e.g., an image of the license plate prior to hook-up). In further variations, the trailer monitoring system 280 can receive the identifying information at the time of hook-up through a data bus connection with a memory resource of the cargo trailer.

Based on the identifying information, the trailer monitoring system 280 can determine any number of configuration parameters of the cargo trailer. For example, the trailer coordination system 280 may include updated cargo logs and trailer characteristic logs for each trailer that can be hooked up to the tractor 200 via a wired connection. Accordingly, the trailer monitoring system 280 can transmit a data request comprising the identifying information for the coupled cargo trailer to the trailer coordination system 280, and receive the logged data corresponding to the cargo trailer. These data can comprise any of the trailer configuration parameters described herein. In variations, the vehicle control system 220 can store an updated trailer log that includes configuration data for each trailer in an available fleet of trailers.

It is contemplated that the coupling procedure between the tractor 200 and the cargo trailer may be automated, including coupling and locking between the kingpin and the fifth wheel of the tractor 200 and the electrical coupling to supply power to the various lights of the cargo trailer. In some aspects, the vehicle control system 220 can implement an automatic coupling procedure to couple the fifth wheel to the kingpin of the cargo trailer and a power-to-power coupling with the cargo trailer. In one aspect, the electrical coupling can cause an initial data transmission from a memory resource of the cargo trailer, which can comprise certain trailer configuration information of the cargo trailer.

According to various examples, once the trailer configuration parameters are determined, the trailer monitoring system 280 can transmit the configuration parameters to the motion planning engine 260, which can construct a new motion planning model or otherwise modify a normal or default motion planning model in accordance with the trailer configuration parameters. The motion planning model can comprise a set of trajectory instructions for executing maneuvers in the overall operation of the tractor 200 with the cargo trailer coupled thereto to ensure safe clearance of the cargo trailer and its rear bogie from curbs, objects, pedestrians, traffic signs, lamp posts, other vehicles, docking facilities, overpasses, and other potential obstacles.

Once the motion planning model is updated by the motion planning engine 260 in accordance with the detected, accessed, received, or determined trailer configuration parameters, the trailer monitoring system 280 can actively monitor the cargo trailer during autonomous operation of the self-driving tractor 200. In certain aspects, the trailer monitoring system 280 can determine whether the cargo trailer has a thrust offset angle, or whether the respective toe angles of the rear bogie's wheels are straight. Additionally, the trailer monitoring system 280 can actively monitor the side clearances of the cargo carrier and the path of the rear bogie, and provide an alert or warning signal to the motion planning engine if the actual trajectory veers from the planned trajectory beyond a tolerance buffer (e.g., ten inches from the planned trajectory). The warning signal can cause the motion planning engine 260 to dynamically update the trajectory, and in some examples, further update the overall motion planning model.

Figure 3:
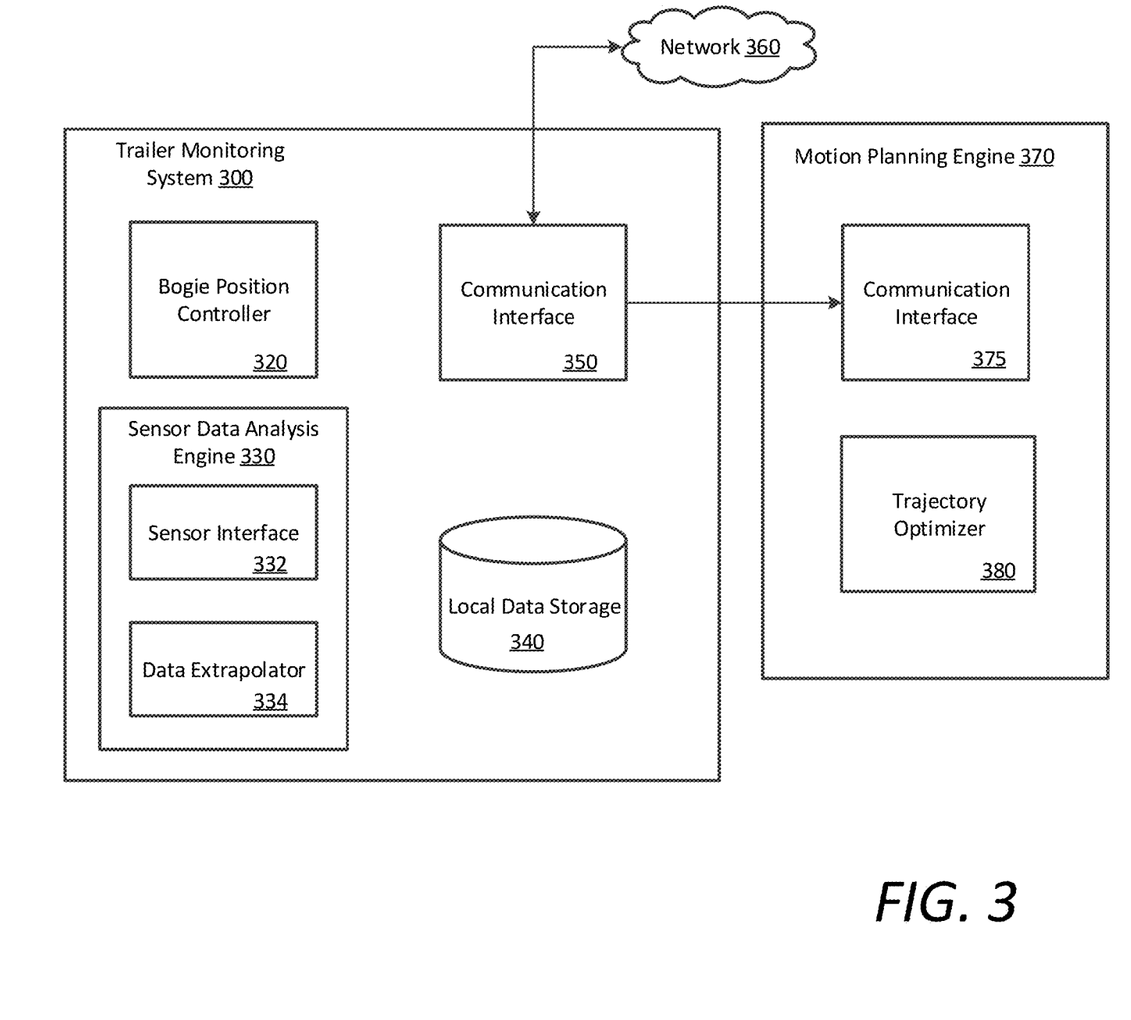
FIG. 3 is a block diagram illustrating an example trailer monitoring system in communication with a motion planning engine of a vehicle control system, according to various example embodiments.

FIG. 3 is a block diagram illustrating an example trailer monitoring system in communication with a motion planning engine of a vehicle control system, according to various examples. The trailer monitoring system 300 and motion planning engine 370 shown and described with respect to FIG. 3 can correspond to the trailer monitoring system 280 and motion planning engine 260 as shown and described in connection with FIG. 2. Referring to FIG. 3, the trailer monitoring system 300 can include a sensor data analysis engine 330, which can analyze sensor data from sensor resources of the tractor to directly detect and determine certain configuration parameters of the cargo trailer. Specifically, the sensor data analysis engine 330 can include a sensor interface 332 that receives image data, LIDAR data, kingpin force data, etc., and a data extrapolator 334 to determine a set of trailer configuration parameters based on the sensor data.

Example configuration parameters that may be directly determined by the data extrapolator 334 can include the dimensions of the cargo trailer—such as the length, width, height, and shape of the trailer—the cargo itself (e.g., for auto-carriers, flatbed carriers, or hazardous materials carriers), the weight of the cargo trailer (e.g., determined from force data), the rear bogie position and axle positions, the number of wheels, tire treads, any aerodynamic features, and the kingpin overhang. The sensor data analysis engine 330 may also detect identifying information specific to the cargo trailer, such as the trailer's license plate or vehicle identification number. A trajectory optimizer 380 of the motion planning engine 380 can parse the various configuration parameters determined from the sensor data analysis engine 330 to generate an updated motion planning model for the tractor's autonomous control system for safely pulling the cargo trailer on a given route.

In certain variations, the trailer monitoring system 300 can also include a bogie position controller 320 that can operate one or more bogie motors to change the position of the rear bogie in relation to the cargo carrier portion of the cargo trailer. For example, the bogie position controller 320 can receive information indicating the cargo weight and/or weight distribution of the cargo from the sensor data analysis engine 330, a local data storage 340 of the trailer monitoring system 300, or from a remote resource via a communication interface 350 and network connection 360, as described herein. In some examples, the trailer monitoring system 300 can perform a lookup in the local data storage 340 or a remote resource via the communication interface 350 and network 360 to determine additional trailer specific information, such as any additional features of the trailer (e.g., boat fairings on the rear doors), the current center of gravity of the trailer, the measured mass of the trailer, tire information, and various configuration parameters that the trailer monitoring system 300 can check to confirm the determined parameters.

Once compiled, the trailer monitoring system 300 can transmit the full suite of trailer configuration parameters to a communication interface 375 of the motion planning engine 370. The trajectory optimizer 380 can process the trailer configuration parameters to determine a set of trajectory instructions that can encompass the motion planning model to be executed by the motion planning engine 370 during autonomous operation of the tractor. Accordingly, the control commands ultimately executed by the various control systems of the tractor can be generated in accordance with a most optimal set of trajectory instructions given the current configuration parameters of the cargo trailer. As a general example, in performing 90 degree turns, the updated motion planning model will cause the control systems of the tractor to travel along a wide trajectory to ensure adequate clearance of the side of the trailer to a nearby sidewalk, traffic signal post, and nearby vehicles, and to further ensure that the rear bogie follows a safe practical trajectory around the turn (e.g., not running over any curbs).

Methodology

Figure 4:
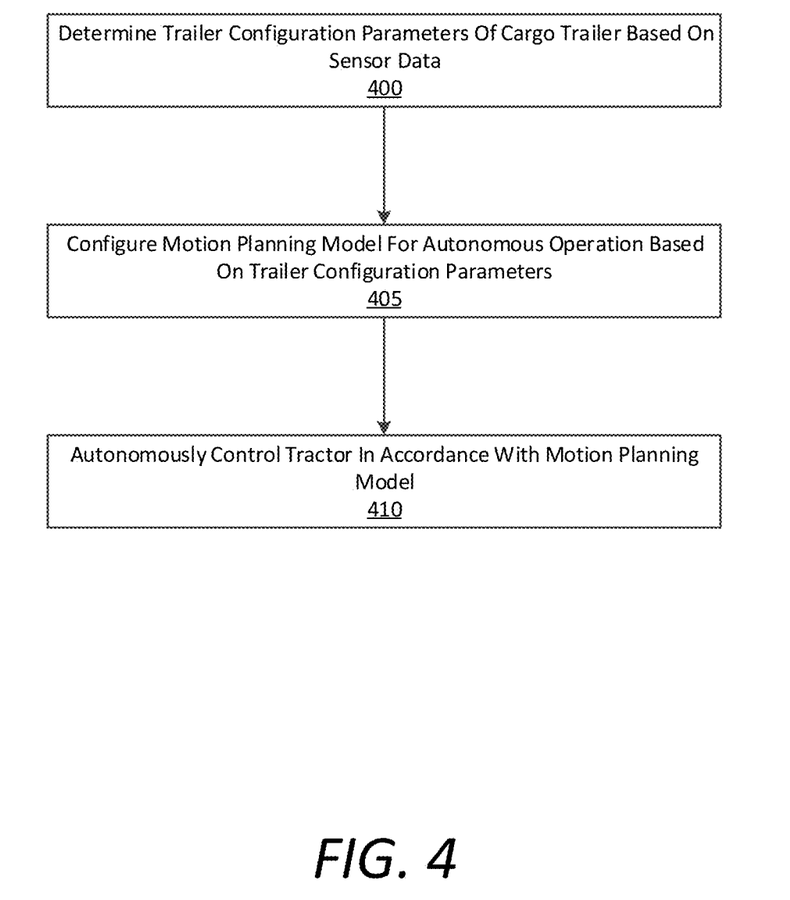
FIG. 4 is a flow chart illustrating an example method of configuring a motion planning model for autonomous operation of a self-driving tractor unit, according to example embodiments described herein.

FIG. 4 is a flow chart describing an example method of configuring a motion planning model for autonomous operation of a self-driving tractor, according to examples described herein. In the below description of FIG. 4, reference may be made to reference characters representing like features as shown and described with respect to FIGS. 1 through 3. Furthermore, the processes described with respect to FIG. 4 may be performed by an example autonomous vehicle control system 220 of a self-driving tractor 200 implementing trailer monitoring and motion planning systems as described throughout the present disclosure.

Referring to FIG. 4, the control system 220 of the self-driving tractor 200 can determine the trailer configuration parameters of a cargo trailer coupled to the fifth wheel of the tractor (400). The control system 220 may then configure a motion planning model for autonomous operation of the tractor 200 based on the trailer configuration parameters (405). The control system 220 may then autonomously control the tractor 200 in accordance with the configured motion planning model (410).

Figure 5:
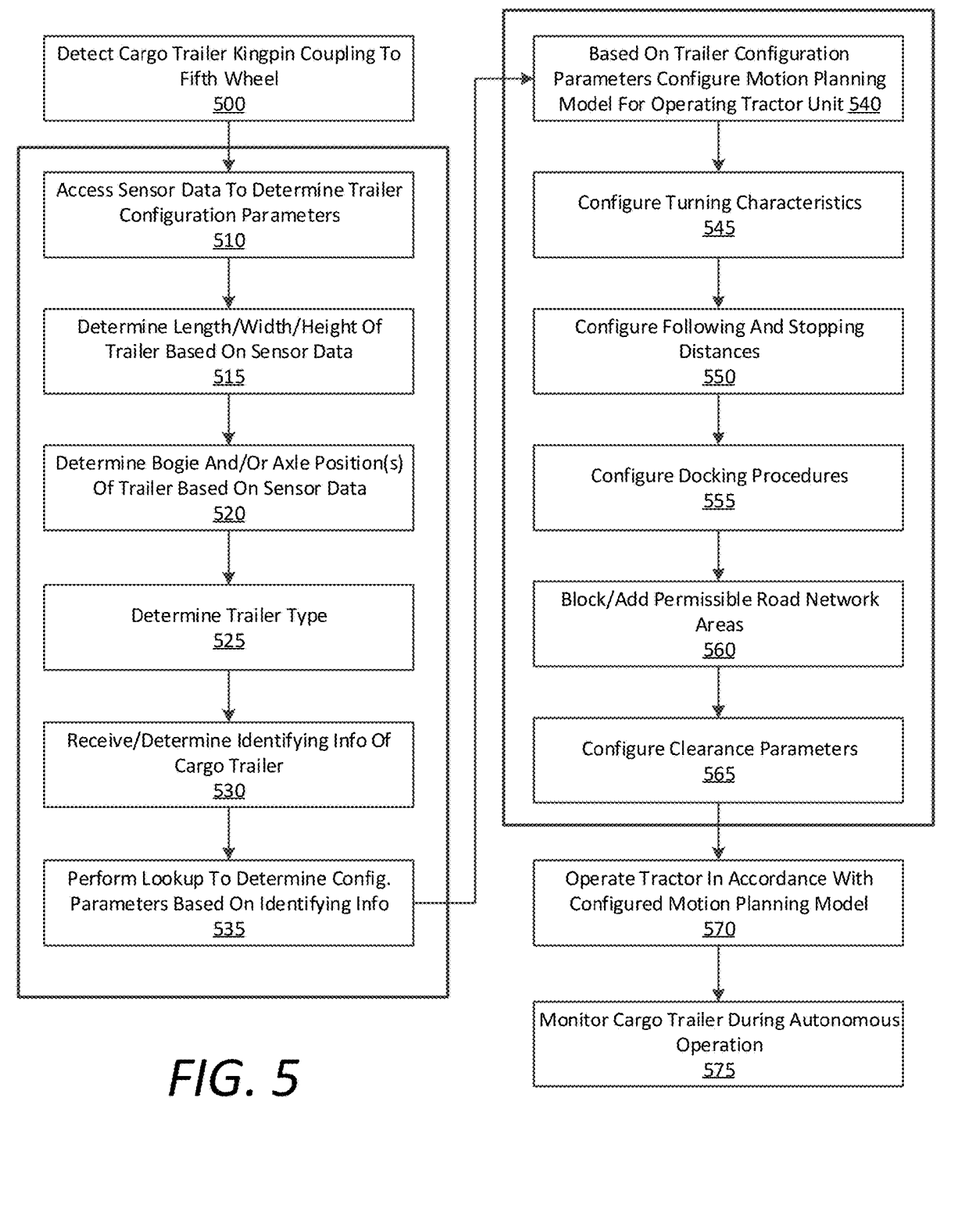
FIG. 5 is a flow chart illustrating another example method of configuring a motion planning model for autonomous operation of a self-driving tractor unit, according to example embodiments described herein.

FIG. 5 is a flow chart also describing an example method of configuring a motion planning model for autonomous operation of a self-driving tractor, according to examples described herein. In the below description of FIG. 5, reference may also be made to reference characters representing like features as shown and described with respect to FIGS. 1 through 3. Furthermore, the processes described with respect to FIG. 5 may also be performed by an example autonomous vehicle control system 220 of a self-driving tractor 200 implementing trailer monitoring and motion planning systems as described throughout the present disclosure.

Referring to FIG. 5, the control system 220 can detect a cargo trailer kingpin coupling to the fifth wheel of the tractor 200 (500). The control system 220 can access sensor data from sensor resources of the tractor 200 to determine the trailer configuration parameters of the cargo trailer (510). For example, the control system 220 can determine the dimensions (e.g., length, width, and height) and/or shape characteristics of the cargo trailer based on the sensor data (515). Additionally or alternatively, the control system 220 can determine the rear bogie position and/or axles positions of the cargo trailer based on the sensor data (520). In further examples, the control system 220 can determine the trailer type, such as whether the cargo trailer is a standard box trailer, a car carrier, a tank trailer, a hazardous materials trailer, a double trailer, a flatbed, etc. (525).

In certain examples, the control system 220 can also receive or otherwise determine identifying information corresponding to the cargo trailer (530). For example, the control system 220 can identify the cargo trailer's license plate or vehicle identification number in the sensor data. In variations, the control system 220 can receive the identifying information from a remote resource or the cargo trailer itself (e.g., via a power connection providing access to a memory resource of the trailer. The control system 220 may then perform a lookup of the configuration parameters of the cargo trailer based on the identifying information (535). For example, the control system 220 can perform the lookup in a remote trailer coordination resource or in a local database comprising updated information of cargo trailers.

According to various implementations, the control system 220 can configure the motion planning model for autonomously operating the tractor 200 based on the trailer configuration parameters (540). For example, the control system 220 can configure the turning characteristics of the tractor 200 based on the individual configuration parameters of the cargo trailer (545). Additionally or alternatively, the control system 220 can configure following and stopping distances based on the trailer configuration parameters (550). In further examples, the control system 220 can configure the docking procedures for the combined tractor 200 and cargo trailer (555). Still further, the control system 220 can block or add permissible road network areas through which the tractor 200 can travel based on the cargo trailer type (e.g., blocking residential neighborhood for hazardous materials cargo) (560).

In additional variations, the control system 220 can configure the clearance parameters of the cargo trailer based on the trailer configuration parameters (565). For example, the clearance parameters may be based on the cargo load (e.g., an oversized load), the cargo itself (e.g., having greater space cushions for tanker cargo, such as gasoline). Once the motion planning model is configured to be custom-tailored for the coupled cargo trailer, the control system 220 can operate the tractor 200 in accordance with the configured motion planning model (570). During autonomous operation, the control system 220 can monitor the cargo trailer 220 to, for example, ensure the accuracy of the motion planning model (575). In one example, the control system 220 monitors the trailing angle of the cargo trailer.

Example Hardware Diagram

Figure 6:
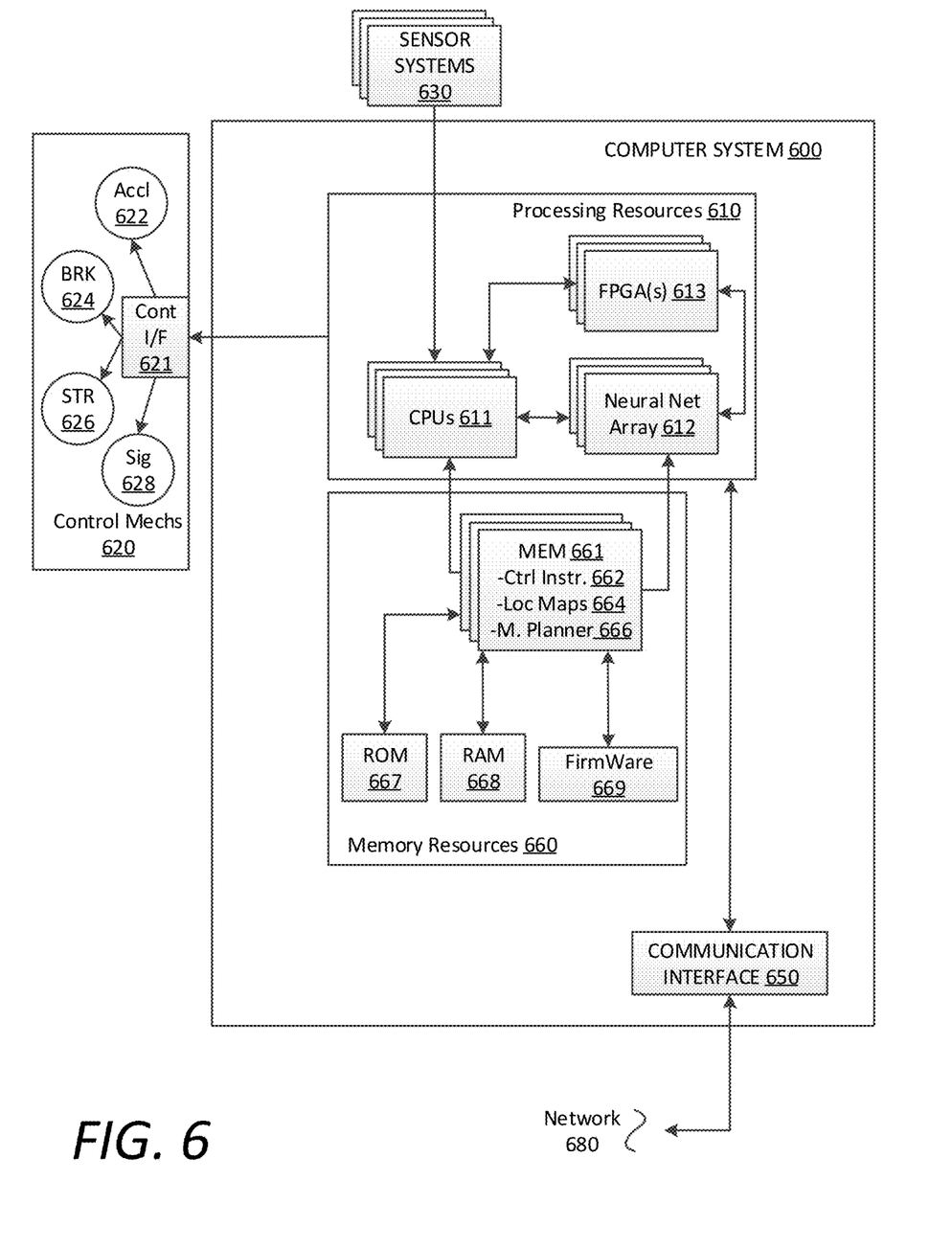
FIG. 6 is a block diagram illustrating a computer system upon which example processing systems of a self-driving tractor unit described herein may be implemented.

FIG. 6 is a block diagram illustrating a computer system upon which example processing systems of a self-driving tractor described herein may be implemented. The computer system 600 can be implemented using a number of processing resources 610, which can comprise computer processing (CPUs) 611 and field programmable gate arrays (FPGAs) 613. In some aspects, any number of processors 611 and/or FPGAs 613 of the computer system 600 can be utilized as components of a neural network array 612 implementing a machine learning model and utilizing road network maps stored in memory 661 of the computer system 600. In the context of FIGS. 2 and 3, various aspects and components of the control system 220, trailer monitoring system 280, 300, and motion planning engine 260,370 can be implemented using one or more components of the computer system 600 shown in FIG. 6.

According to some examples, the computer system 600 may be implemented within a self-driving tractor with software and hardware resources such as described with examples of FIGS. 2 and 3. In an example shown, the computer system 600 can be distributed spatially into various regions of the self-driving tractor, with various aspects integrated with other components of the tractor itself. For example, the processing resources 610 and/or memory resources 660 can be provided in a cargo space of the self-driving tractor. The various processing resources 610 of the computer system 600 can also execute control instructions 662 using microprocessors 611, FPGAs 613, a neural network array 612, or any combination of the foregoing.

In an example of FIG. 6, the computer system 600 can include a communication interface 650 that can enable communications over a network 680. In one implementation, the communication interface 650 can also provide a data bus or other local links to electro-mechanical interfaces of the vehicle, such as wireless or wired links to and from control mechanisms 620 (e.g., via a control interface 621), sensor systems 630, and can further provide a network link to a backend transport management system or a remote teleassistance system (implemented on one or more datacenters) over one or more networks 680.

The memory resources 660 can include, for example, main memory 661, a read-only memory (ROM) 667, storage device, and cache resources. The main memory 661 of memory resources 660 can include random access memory (RAM) 668 or other dynamic storage device, for storing information and instructions which are executable by the processing resources 610 of the computer system 600. The processing resources 610 can execute instructions for processing information stored with the main memory 661 of the memory resources 660. The main memory 661 can also store temporary variables or other intermediate information which can be used during execution of instructions by the processing resources 610. The memory resources 660 can also include ROM 667 or other static storage device for storing static information and instructions for the processing resources 610. The memory resources 660 can also include other forms of memory devices and components, such as a magnetic disk or optical disk, for purpose of storing information and instructions for use by the processing resources 610. The computer system 600 can further be implemented using any combination of volatile and/or non-volatile memory, such as flash memory, PROM, EPROM, EEPROM (e.g., storing firmware 669), DRAM, cache resources, hard disk drives, and/or solid state drives.

The memory 661 may also store localization maps 664 in which the processing resources 610—executing control instructions 662—continuously compare to sensor data from the various sensor systems 630 of the self-driving tractor. Execution of the control instructions 662 can cause the processing resources 610 to generate control commands in order to autonomously operate the tractor's acceleration 622, braking 624, steering 626, and signaling systems 628 (collectively, the control mechanisms 620). Thus, in executing the control instructions 662, the processing resources 610 can receive sensor data from the sensor systems 630, dynamically compare the sensor data to a current localization map 664, and generate control commands for operative control over the acceleration, steering, and braking of the AV along a particular route plan. The processing resources 610 may then transmit the control commands to one or more control interfaces 621 of the control mechanisms 620 to autonomously operate the self-driving tractor along an autonomy route.

The memory may also store a motion planning model 666 that determines that manner in which the processing resources 610 generate control commands for execution by the control mechanisms 620 of the tractor. As described herein, the processing resources 610 can configure, modify, or generate the motion planning model 666 based on the trailer configuration parameters of a coupled cargo trailer, as described herein.

While examples of FIG. 6 provide for computing systems for implementing aspects described, some or all of the functionality described with respect to one computing system of FIG. 6 may be performed by other computing systems described with respect to FIG. 6.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A control system comprising one or more processors configured to execute instructions to cause the control system to:
    access a motion planning model for autonomously operating the self-driving tractor;
    obtain a set of trailer parameters of a cargo trailer coupled to a self-driving tractor;
    modify the motion planning model for autonomously operating the self-driving tractor based on the set of trailer parameters;
    generate one or more trajectories for the self-driving tractor based on the motion planning model; and
    generate one or more control commands for at least one vehicle control mechanism of the self-driving tractor based on the one or more trajectories.

2. The control system of claim 1, wherein the self-driving tractor comprises a plurality of vehicle control mechanisms, and wherein the vehicle control mechanisms comprise an acceleration system, a braking system, and a steering system.

3. The control system of claim 1, wherein the instructions further cause the control system to:
    detect a coupling of the cargo trailer to the self-driving tractor; and
    obtain the set of trailer parameters in response to detecting the coupling of the cargo trailer to the self-driving tractor.

4. The control system of claim 1, wherein the motion planning model comprises a set of trajectory instructions for executing one or more maneuvers for transporting the cargo trailer along a route.

5. The control system of claim 4, wherein the set of trajectory instructions comprise at least one of (i) one or more turning characteristics, (ii) one or more spacing characteristics, or (iii) one or more docking procedures.

6. The control system of claim 1, wherein the set of trailer parameters is indicative of at least one of (i) a length, (ii) a width, (iii) a height, (iv) one or more shape characteristics, (v) a cargo weight, (vi) a weight distribution, (vii) a center of gravity, (viii) one or more tire characteristics, (ix) a kingpin overhang length, (x) or an initial trailer angle of the cargo trailer.

7. The control system of claim 1, wherein generating the one or more trajectories for the self-driving tractor based on the motion planning model further comprises:

obtaining sensor data indicative of a current road segment on which the self-driving tractor is autonomously operating, wherein the sensor data identifies one or more objects of interest; and generating the one or more trajectories for the self-driving tractor based on the one or more objects of interest and the motion planning model.

8. The control system of claim 7, wherein the motion planning model is indicative of one or more clearance parameters for the one or more objects of interest.

9. The control system of claim 1, wherein the instructions further cause the control system to:

obtain transportation instructions for the cargo trailer, the transportation instructions indicative of a destination location for the cargo trailer; and obtain a route plan for the self-driving tractor based on the motion planning model, the destination location for the cargo trailer, and map data.

10. The control system of claim 9, wherein the set of trailer parameters is indicative of a cargo type, and wherein the motion planning model is indicative of one or more permissible road network areas based on the cargo type.

11. The control system of claim 10, wherein the route plan is based on the one or more permissible road network areas.

12. The control system of claim 11, further comprising:

a wireless communication interface connecting the control system to a remote coordination service, wherein the transportation instructions for the cargo trailer are obtained from the remote coordination service.

13. A self-driving tractor for a semi-trailer truck, comprising:

a plurality of control mechanisms; and a control system comprising processing resources executing instructions that cause the control system to:

access a motion planning model for autonomously operating the self-driving tractor;

obtain a set of trailer parameters of a cargo trailer coupled to the self-driving tractor;

modify the motion planning model for autonomously operating the self-driving tractor based on the set of trailer parameters;

generate one or more trajectories for the self-driving tractor based on the motion planning model; and generate one or more control commands for at least one of the plurality of control mechanisms based on the one or more trajectories.

14. The self-driving tractor of claim 13, wherein the set of trailer parameters are indicative of at least one of (i) a weight, (ii) a weight distribution, or (iii) a center of gravity of the cargo trailer.

15. The self-driving tractor of claim 13, wherein the instructions further cause the control system to:

monitor one or more characteristics of the cargo trailer during autonomous operation of the self-driving tractor; and update the one or more trajectories based on the one or more characteristics of the cargo trailer during autonomous operation of the self-driving tractor.

16. The self-driving tractor of claim 15, wherein the one or more characteristics of the cargo trailer comprise a thrust offset angle.

17. The self-driving tractor of claim 15, wherein the one or more characteristics of the cargo trailer comprise one or more side clearances for the cargo trailer.

18. The self-driving tractor of claim 13, wherein the executed instructions further cause the one or more processors to:

determine an offset distance between at least one of the one or more trajectories and an actual trajectory of the self-driving tractor; and provide an alert based on the offset distance and a tolerance buffer associated with the one or more trajectories.

19. The self-driving tractor of claim 18, wherein the executed instructions further cause the one or more processors to:

update the motion planning model based on the alert.

20. A computer implemented method for controlling a self-driving tractor, the method comprising:

accessing a motion planning model for autonomously operating the self-driving tractor;

obtaining a set of trailer parameters of a cargo trailer coupled to the self-driving tractor;

modifying the motion planning model for autonomously operating the self-driving tractor based on the set of trailer parameters;

generating one or more trajectories for the self-driving tractor based on the motion planning model; and generating one or more control commands for at least one of the plurality of control mechanisms based on the one or more trajectories, the one or more control commands configured to cause a movement of the self-driving tractor.

* * * * *